United States Patent
Seifert et al.

(10) Patent No.: US 9,806,487 B2
(45) Date of Patent: Oct. 31, 2017

(54) OPTICAL FIBER SYSTEM HAVING A REMOTE POWER MODULE

(71) Applicant: NUFERN, East Granby, CT (US)

(72) Inventors: Martin Seifert, West Simsbury, CT (US); Scott Christensen, West Hartford, CT (US)

(73) Assignee: Nufern, East Granby, CT (US)

(*) Notice: Subject to any disclaimer, the term of this patent is extended or adjusted under 35 U.S.C. 154(b) by 0 days.

(21) Appl. No.: 14/775,180

(22) PCT Filed: Mar. 12, 2014

(86) PCT No.: PCT/US2014/024528
§ 371 (c)(1),
(2) Date: Sep. 11, 2015

(87) PCT Pub. No.: WO2014/165134
PCT Pub. Date: Oct. 9, 2014

(65) Prior Publication Data
US 2016/0049766 A1    Feb. 18, 2016

Related U.S. Application Data

(60) Provisional application No. 61/779,718, filed on Mar. 13, 2013.

(51) Int. Cl.
*H01S 3/067* (2006.01)
*H01S 3/094* (2006.01)
(Continued)

(52) U.S. Cl.
CPC ........ *H01S 3/06758* (2013.01); *H01S 3/0014* (2013.01); *H01S 3/094003* (2013.01);
(Continued)

(58) Field of Classification Search
CPC .......................... H01S 3/2316; H01S 3/06758
See application file for complete search history.

(56) References Cited

U.S. PATENT DOCUMENTS 5,155,780 A * 10/1992 Zirngibl ............... H01S 3/1302
372/6
5,245,690 A *  9/1993 Aida .................... H01S 3/1301
359/337.11
(Continued)

FOREIGN PATENT DOCUMENTS

| CN | 202513435 | 10/2012 |
|----|-----------|---------|
| EP | 0903876   | 3/1999  |
| WO | 00/70797  | 11/2000 |

OTHER PUBLICATIONS

International Preliminary Report on Patentability dated Sep. 15, 2015 for International Application No. PCT/US2014/024528 filed Mar. 12, 2014, 8 pages.
(Continued)

*Primary Examiner* — Eric Bolda
(74) *Attorney, Agent, or Firm* — McDonnell Boehnen Hulbert & Berghoff LLP

(57) ABSTRACT

The present invention relates generally to high brightness optical fiber systems and, more particularly to optical fiber systems 104 having an optical power module 151 remote from an initial amplifier stage 101. In one aspect of the invention, the optical fiber system comprises a first active optical fiber 102 operatively coupled to one or more first pump sources 104; a first signal optical fiber 110 coupled to the first active optical fiber 102; one or more final pump sources 120; one or more final pump optical fibers 130, coupled to one or more of the final pump sources 120; and spatially separated from the one or more final pump sources 120 and the initial amplifier stage 101 comprising the first active optical fiber 102, a power module 151, comprising a final active optical fiber 150, coupled to the first signal
(Continued)

optical fiber 110, said final active optical fiber 150 being coupled to said one or more final pump optical fibers 130.

27 Claims, 6 Drawing Sheets

(51) Int. Cl.
  *H01S 3/23* (2006.01)
  *H01S 3/00* (2006.01)
  *B23K 26/00* (2014.01)
  *H01S 3/30* (2006.01)
  *H01S 3/04* (2006.01)
  *H01S 3/042* (2006.01)

(52) U.S. Cl.
  CPC ...... *H01S 3/094096* (2013.01); *H01S 3/2316* (2013.01); *B23K 26/00* (2013.01); *H01S 3/0064* (2013.01); *H01S 3/042* (2013.01); *H01S 3/0407* (2013.01); *H01S 3/067* (2013.01); *H01S 3/0675* (2013.01); *H01S 3/302* (2013.01)

(56) References Cited

U.S. PATENT DOCUMENTS

| | | | | |
|---|---|---|---|---|
| 5,321,707 | A * | 6/1994 | Huber | H01S 3/094003 372/6 |
| 5,703,990 | A * | 12/1997 | Robertson | H01S 3/06704 359/341.1 |
| 5,903,385 | A * | 5/1999 | Sugaya | H04B 10/077 359/337 |
| 6,175,436 | B1 * | 1/2001 | Jackel | H01S 3/1302 359/337 |
| 8,379,298 | B2 * | 2/2013 | Clowes | H01S 3/06758 359/341.32 |
| 8,593,726 | B2 * | 11/2013 | Clowes | H01S 3/06758 359/346 |
| 8,767,287 | B2 * | 7/2014 | Clowes | H01S 3/06758 359/341.1 |
| 8,902,496 | B2 * | 12/2014 | Clowes | H01S 3/06758 359/341.5 |
| 9,287,677 | B2 * | 3/2016 | Clowes | H01S 3/06758 |
| 2002/0037145 | A1 * | 3/2002 | Irie | G02B 6/02033 385/127 |
| 2010/0110535 | A1 | 5/2010 | Murison et al. | |
| 2010/0157419 | A1 * | 6/2010 | Clowes | H01S 3/06758 359/341.31 |

OTHER PUBLICATIONS

Nufern: "NUkW (TM)—Harnessing Power" (Jan. 15, 2013) Retrieved from the Internet on Jun. 24, 2014, 2 pages.

International Search Report dated Jul. 15, 2014 of International Application No. PCT/US2014/024528 filed Mar. 12, 2014, 5 pages.

* cited by examiner

OPTICAL FIBER SYSTEM HAVING A REMOTE POWER MODULE

CROSS-REFERENCE TO RELATED APPLICATIONS

This application claims the benefit of priority of U.S. Provisional Patent Application Ser. No. 61/779,718, filed Mar. 13, 2013, which is hereby incorporated herein by reference in its entirety.

BACKGROUND OF THE INVENTION

1. Field of the Invention

The present invention relates generally to optical fiber amplifiers such as optical fiber lasers. The present invention relates more particularly to optical fiber systems having an optical power head containing an amplifier stage remote from one or more initial amplifier stages.

2. Technical Background

Optical fiber lasers have many attractive properties that make them suitable for various industrial applications. Such properties can include one or more of good beam quality, easy thermal management, compact size, and good efficiency. Fiber lasers are therefore often preferred to conventional types of lasers, such as solid-state and gas lasers. Fiber lasers are able to produce optical output in the several kW range with excellent beam quality. Thus, these lasers can be used for macro-machining applications like welding and cutting of metal. Furthermore, fiber lasers lend themselves for operation with ultra-short pulses by a method of mode-locking, enabling them to be used in micro-machining applications as well.

Multi-stage fiber lasers are able to provide high brightness optical power, near the diffraction limit for the system. But as power increases, so does the physical size, mass, volume and complexity of the laser itself and also that of requisite ancillary equipment such as cooling and electrical power supply. In many applications this volume of equipment can hinder deployment, as space at or near the point of laser use is often limited and/or expensive. In some instances, the environment at the point of use can also be hostile, requiring further bulk and complexity resulting from additional protective equipment such as shielding, hermetic containers, and EMI and ESD protection. Use of an optical fiber to propagate laser output light from a laser device itself to the point of use is generally well known. But this method of beam delivery is not suitable for propagating high brightness or near diffraction limited beams. High brightness, near diffraction limited fiber beam delivery is substantially limited in length by the onset of parasitic physical effects in the beam delivery fiber itself, for example, Brillouin backscattering and Raman wavelength shifting. Accordingly, beam delivery fibers for high power diffraction limited fiber lasers are often limited to about 1 meter in length or less.

Accordingly, there remains a need for optical fiber lasers that can be used to provide high optical power without suffering from the drawbacks or deficiencies of the prior art.

SUMMARY OF THE INVENTION

One aspect of the present invention is an optical fiber system (such as an optical fiber laser) comprising an initial amplifier stage comprising a first active optical fiber operatively coupled to one or more first pump sources, the first active optical fiber having an output;

a first signal optical fiber having an input operatively coupled to the output of the first active optical fiber and an output;

one or more final pump sources;

one or more final pump optical fibers, each having an input coupled to one or more of the final pump sources and an output; and separated from the one or more final pump sources and the initial amplifier stage, a power module comprising a final amplifier stage, the final amplifier stage comprising a final active optical fiber having an input operatively coupled to the output of the first signal optical fiber and an output, the final active optical fiber being operatively coupled to the outputs of the one or more final pump optical fibers.

Another aspect of the invention is a method for generating high power radiation comprising providing an initial amplifier stage comprising a first active optical fiber, and a final amplifier stage comprising a final active optical fiber;

pumping the first active optical fiber with one or more first pump sources, thereby providing a first optical signal at an output of the first active optical fiber;

transmitting the first optical signal from the output of the first active optical fiber to an input of the final active optical fiber using a first signal optical fiber;

pumping the final active optical fiber with one or more final pump sources to provide the high power radiation at an output of the final active optical fiber;

wherein the final active optical fiber is provided in a power module separated from the one or more final pump sources and the first active optical fiber.

In various aspects, the present invention can result in a number of benefits. For example, in certain embodiments, the optical fiber systems of the present invention can provide high optical power at a remote site, without requiring cooling, power supply, or nonoptical protective equipment at the point of use.

As the person of ordinary skill in the art will appreciate, the drawings are not necessarily drawn to scale, and various elements of the systems may, in certain drawings, be omitted for purposes of clarity.

DETAILED DESCRIPTION OF THE INVENTION

In the following discussion it is assumed that the reader has the basic knowledge of the structure of optical fibers familiar to the person of ordinary skill in the art. Thus, the concepts of a fiber core, cladding, and coating are not discussed in detail. As is familiar to the person of ordinary skill in the art, the radiation generated in an active optical fiber device, such as a fiber laser or fiber amplifier, here referred to as the signal, propagates generally in the core of the fiber, the diameter of which is typically in the range of a few microns to a few tens of microns. As used herein, the term "signal" does not imply that the radiation is encoded with any meaning; rather, it is simply the name commonly used in the optical fiber arts for radiation being transmitted by an optical fiber.

The terms "light" or "optical", as used herein, are used broadly as understood by one of ordinary skill in the art of optical waveguides, and are not to be limited as pertaining only to the visible range of wavelengths.

The present inventors have addressed the drawbacks in the prior art by designing optical fiber systems in which the final amplifier stage (e.g., in the form of a power head) can be remote from the bulk of the system. The final amplifier stage can be moved to within a short distance of the intended point of use. Thus, the bulk of the system can be placed in a convenient and secure location conceivably tens (or in certain embodiments, hundreds, or even thousands) of meters from the point of use, without jeopardizing the performance and utility of the system. Based on the present disclosure, the person of ordinary skill in the art can make select components and device architecture such that pump and signal intensities in their respective optical fibers are low enough to avoid the onset of deleterious parasitic effects (or to keep these same effects within tolerable limits).

Figure 1:
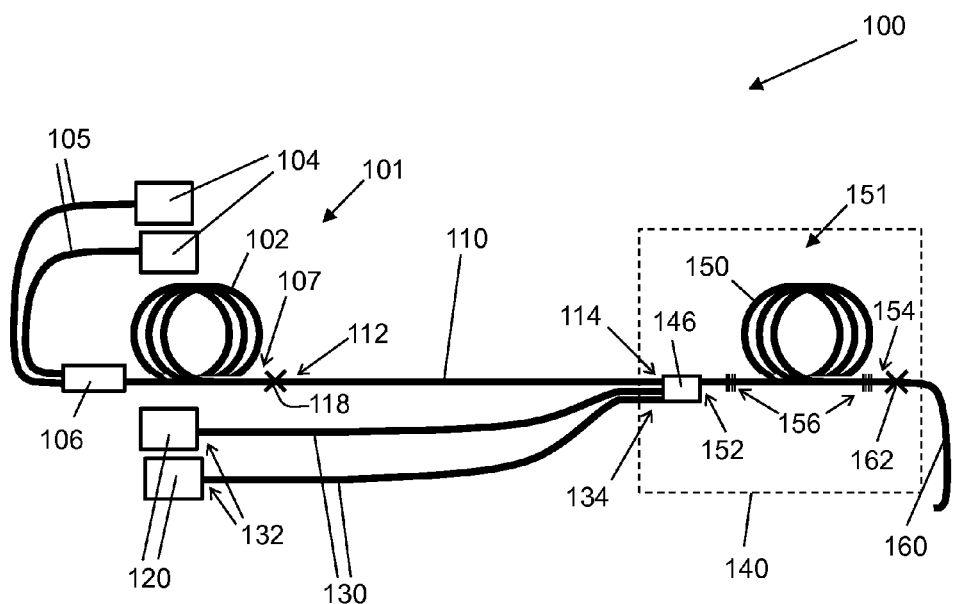
FIG. 1 is a schematic view of an optical fiber laser according to one embodiment of the invention.

One embodiment of the invention is shown in schematic view in FIG. 1. Optical fiber system 100 includes an initial amplifier stage 101, which includes first active optical fiber 102, operatively coupled to one or more (here, two) first pump sources 104. The initial amplifier stage can be configured, for example, as a seed laser, as is conventional in the art. As the person of ordinary skill in the art will appreciate, an active optical fiber is an optical fiber that, when pumped with radiation at a pump wavelength, can emit amplified energy at a signal wavelength. Examples of such active optical fibers include rare-earth optical fibers, doped with rare earth atoms such as erbium, ytterbium, neodymium, thulium or combinations thereof (e.g., Er:Yb). In certain embodiments, an active optical fiber provides amplification through stimulated Raman scattering, stimulated Brillouin scattering, or some other nonlinear optical effect. The person of ordinary skill in the art will appreciate that an active optical fiber can be formed from two or more active optical fiber segments that are spliced or otherwise coupled together.

As the person of ordinary skill in the art will appreciate, the one or more first pump sources are configured such that they provide energy at one or more pump wavelengths to the first active optical fiber; the first active optical fiber converts the energy of the one or more first pump sources to energy at a signal wavelength. The wavelength(s) of the pump energy are selected to be an appropriate pump wavelength for the particular type of active optical fiber used as the first active optical fiber (e.g., a rare earth-doped active optical fiber). For example, when the active optical fiber is a ytterbium-doped optical fiber, in certain embodiments the one or more first pump sources can provide a pump wavelength of about 910 nm, or about 975 nm. When the active optical fiber is a thulium-doped optical fiber, in certain embodiments the source of optical pump energy can provide a pump wavelength of about 790 nm. The one or more first pump sources can be, for example, diode lasers. In the embodiment depicted in FIG. 1, the first pump sources 104 are operatively coupled to the first active optical fiber 102 through optical fibers 105 and coupler 106. The person of ordinary skill in the art will appreciate that the one or more first pump sources can alternatively be operatively coupled to the first active optical fiber in a variety of other ways. Similarly, while first active optical fiber 102 is depicted in FIG. 1 as being pumped by the one or more first pump sources 104 in co-pumped configuration, the person of ordinary skill in the art will appreciate that other pumping configurations can be used, such as counter-pumping or co/counter-pumping.

As the person of ordinary skill in the art will appreciate, the first active optical fiber can in some embodiments be disposed between two at least partially reflective elements to form a laser cavity. The at least partially reflective elements can be, for example, fiber Bragg gratings, or at least partially reflective mirrors. As the person of ordinary skill in the art will appreciate, the fiber Bragg gratings can be formed in the first active optical fiber itself, as shown, or can be disposed at the ends of the first active optical fiber. Of course, in other embodiments, and as shown in FIG. 1, the first active optical fiber is not disposed between two at least partially reflective elements (i.e., is not part of a laser cavity).

In the embodiment of FIG. 1, first active optical fiber has an output 107. A first signal optical fiber 110 has an input 112 and an output 114. As will be apparent from the description of FIG. 1, the first signal optical fiber transmits radiation from the first active optical fiber (e.g., in a pre-amplifying initial stage of a multi-stage system such as a multi-stage laser system) to a final active optical fiber (e.g., in a power amplifying final stage of a multi-stage system). Accordingly, output 107 of first active optical fiber 102 is operatively coupled to the input 112 of the signal optical fiber 110, such that the signal is transmitted from the first active optical fiber to the first signal optical fiber. In the device depicted in FIG. 1, the first active optical fiber and the first signal optical fiber are coupled by splice 118. But as the person of ordinary skill in the art will appreciate, the first signal optical fiber and the first active optical fiber can be coupled in some other manner, e.g., through a fiber coupler.

In certain embodiments, the first signal optical fiber has a length of at least about 1 m, at least about 2 m, at least about 5 m, 10 m, at least about 20 m, or even at least about 50 m. In certain such embodiments, the first signal optical fiber has a length of no more than about 100 m, no more than about 500 m, no more than about 1000 m, or even no more than about 10000 m. For example, in one embodiment, the first signal optical fiber has a length in the range of about 1 m to about 100 m.

In the embodiment of FIG. 1, the optical fiber system 100 includes one or more final pump sources 120. The one or more final pump sources are configured such that they provide energy at one or more final pump wavelengths to a final active optical fiber (described below). The one or more final pump sources can provide pump energy at the same or different wavelength(s) than the one or first pump sources. The one or more final pump sources can be, for example, diode lasers.

The optical fiber laser of FIG. 1 also includes one or more final pump optical fibers 130, each having an input 132 coupled to one or more of the final pump sources 120 and an output 134. In certain embodiments, each of the one or more final pump optical fibers has a length of at least about 1 m, at least about 2 m, at least about 5 m, 10 m, at least about 20 m, or even at least about 50 m. In certain such embodiments, each of the one or more final pump optical fibers has a length of no more than about 100 m, no more than about 500 m, no more than about 1000 m, or even no more than about 10000 m. For example, in one embodiment, each of the one or more final pump optical fibers has a length in the range of about 1 m to about 100 m.

The optical fiber device also includes, separated from the one or more final pump sources and the first active optical fiber, a power module 140. The power module 140 includes final amplifier stage 151 including a final active optical fiber 150, which has an input 152 operatively coupled to the output 114 of the first signal optical fiber and an output 154. The final active optical fiber is operatively coupled to the outputs 134 of the one or more final pump optical fibers 130, such that the one or more final pump sources pump the final active optical fiber through the one or more final pump optical fibers. In the embodiment depicted in FIG. 1, the outputs 134 of the one or more final optical fibers 130 and the output 114 of the first signal optical fiber 110 are operatively coupled to the final active optical fiber 150 through coupler 146. The person of ordinary skill in the art will appreciate that the outputs of the one or more final optical fibers and the output of the first signal optical fiber can alternatively be operatively coupled to the final active optical fiber in a variety of other ways. Similarly, while first active optical fiber 102 is depicted in FIG. 1 as being pumped by the one or more first pump sources 104 in co-pumped configuration, the person of ordinary skill in the art will appreciate that other pumping configurations can be used, such as counter-pumping or co/counter-pumping.

As the person of ordinary skill in the art will appreciate, the final active optical fiber can, in some embodiments, be disposed between two at least partially reflective elements to form a final laser cavity. The at least partially reflective elements can be, for example, fiber Bragg gratings, or at least partially reflective mirrors. For example, in the embodiment of FIG. 1, the final active optical fiber is disposed between two fiber Bragg gratings 156. As the person of ordinary skill in the art will appreciate, the fiber Bragg gratings can be formed in the final active optical fiber itself, as shown, or can be disposed at the ends of the final active optical fiber. In other embodiments, the final active optical fiber is not disposed between two at least partially reflective elements (i.e., is not part of a laser cavity).

The person of ordinary skill in the art will also understand that other optical devices, such as isolators, polarization controllers, signal monitors, cladding mode strippers, etc., can be included in the optical fiber systems of the present invention. For purposes of clarity, such devices are generally not depicted in the Figures.

Accordingly, the optical fiber device of FIG. 1 can be configured as a multi-stage system, with the first active optical fiber being part of an initial amplifier stage (e.g., a pre-amplifying stage), and the final active optical fiber being part of a final amplifier stage (e.g., a power stage). Notably, the power module is separated from the one or more final pump sources and the initial amplifier stage (i.e., including the first active optical fiber). For example, in certain embodiments, the optical path length between the first active optical fiber (i.e., including the one or more first pump sources) and the final active optical fiber is at least about 1 m, at least about 2 m, at least about 5 m, 10 m, at least about 20 m, or even at least about 50 m; and the optical path length between each of the one or more final pump sources and the final active optical fiber is at least about 1 m, at least about 2 m, at least about 5 m, 10 m, at least about 20 m, or even at least about 50 m. In certain such embodiments, the optical path length between the first active optical fiber and the final active optical fiber is no more than about 50 m, no more than about 100 m, no more than about 500 m, no more than about 1000 m, or even no more than about 10000 m, and the optical path length between each of the one or more final pump sources and the final active optical fiber is no more than about 100 m, no more than about 500 m, no more than about 1000 m, or even no more than about 10000 m. For example, in one embodiment, the optical path length between the first active optical fiber and the final active optical fiber is in the range of about 1 to about 100 m, and the optical path length between each of the one or more final pump sources and the final active optical fiber is in the range of about 1 m to about 100 m. In another embodiment, the optical path length between the first active optical fiber and the final active optical fiber is in the range of about 2 m (or about 5 m) to about 100 m, and the optical path length between each of the one or more final pump sources and the final active optical fiber is in the range of about 2 m (or about 5 m) to about 100 m. In another embodiment, the optical path length between the first active optical fiber and the final active optical fiber is in the range of about 1 m (or about 2 m) to about 50 m, and the optical path length between each of the one or more final pump sources and the final active optical fiber is in the range of about 1 m (or about 2 m) to about 50 m.

Such optical path distances can allow the power module to be spatially separated from the first active optical fiber and the one or more final pump sources. For example, in certain embodiments, the spatial distance between the initial amplifier stage (i.e., including the first active optical fiber and the one or more first pump sources) and the final active optical fiber is at least about 1 m, at least about 2 m, at least about 5 m, at least about 10 m, at least about 20 m, or even at least about 50 m; and the spatial distance between each of the one or more final pump sources and the final active optical fiber is at least about 1 m, at least about 2 m, at least about 5 m, 10 m, at least about 20 m, or even at least about 50 m. In certain such embodiments, the spatial distance between the first active optical fiber and the final active optical fiber is no more than about 50 m, no more than about 100 m, no more than about 500 m, no more than about 1000 m, or even no more than about 10000 m, and the spatial distance between each of the one or more final pump sources and the final active optical fiber is no more than about 100 m, no more than about 500 m, no more than about 1000 m, or even no more than about 10000 m. For example, in one embodiment, the spatial separation between the initial amplifier stage and the final active optical fiber is in the range of about 1 m to about 100 m, and the spatial separation between each of the one or more final pump sources and the final active optical fiber is in the range of about 1 m to about 100 m. In another embodiment, the spatial separation between the initial amplifier stage and the final active optical fiber is in the range of about 2 m (or about 5 m) to about 100 m, and the spatial separation between each of the one or more final pump sources and the final active optical fiber is in the range of about 2 m (or about 5 m) to about 100 m. In another embodiment, the spatial separation between the initial amplifier stage and the final active optical fiber is in the range of about 1 m (or about 2 m) to about 50 m, and the spatial separation between each of the one or more final pump sources and the final active optical fiber is in the range of about 1 m (or about 2 m) to about 50 m. Spatial separation of the power module from the initial amplifier stage and the one or more final pump sources can result in a number of advantages. For example, bulky control, power supply and cooling devices associated with the pump sources and the first active optical fiber can be provided at a location remote from the point of ultimate use of radiation generated by the system, thus conserving the limited and/or expensive space at the point of use.

In certain embodiments, the device can also include an output optical fiber operatively coupled to the output of the final active optical fiber to deliver the laser radiation from the final active optical fiber to a desired site (e.g., the point of use). For example, in the optical fiber system 100 of FIG. 1, output optical fiber 160 is coupled to the output 154 of the final active optical fiber (here, through splice 162). Notably, in certain desirable embodiments, the total length of optical fiber operatively coupled to the output of the final active optical fiber is less than about 10 m, less than about 5 m, less than about 2 m, or even less than about 1 m. It can be desirable to keep the length of the output optical fiber as short as possible in order to limit the onset of parasitic physical effects therein, for example, Brillouin backscattering and Raman wavelength shifting.

Notably, all of the pump energy for the final active optical fiber can be provided by the one or more final pump fibers. Accordingly, the power amplification stage can be operated without a pump laser, or associated power supplies control electronics, in the power module. Thus, in certain embodiments, the power module (or the power module enclosure, described below) does not include a pump laser. In certain embodiments, the power module (or the power module enclosure, described below) does not include a power supply or control electronics. Accordingly, the power module (or the power module enclosure, described below) can be relatively small, taking up relatively little space at the point of use.

Moreover, for similar reasons, the power amplification stage does not require the use of any electrical or electronic devices. Accordingly, in certain embodiments, the power module (or the power module enclosure, described below) does not include any electrical or electronic devices. Advantageously, such a power module (or the power module enclosure, described below) would not require the same level of shielding and electromagnetic interference and electrostatic discharge protection as would a power module that includes electrical or electronic devices. Moreover, such a power module (or the power module enclosure, described below) would not require the same level of hermeticity as would a power module that includes electrical or electronic devices, and would not be as sensitive to environmental conditions as a power module that includes electrical or electronic devices. Advantageously, in embodiments in which no electrical or electronic devices are provided in the power module or the power module enclosure, there is a much lower risk of electromagnetic interference, electromagnetic discharge, or electromagnetic pulses affecting signal quality at the power head.

Figure 2:
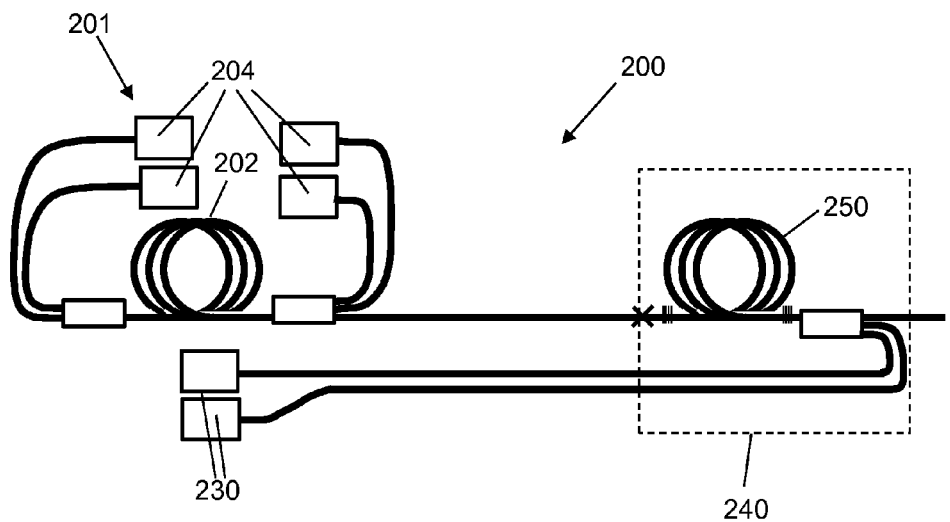
FIG. 2 is a schematic view of an optical fiber laser according to another embodiment of the invention.

Another embodiment of an optical fiber system is shown in schematic view in FIG. 2. In the initial amplifier stage 201 of this embodiment, the first active optical fiber 202 of optical fiber laser 200 is both co- and counter-pumped by first pump sources 204, while final active optical fiber 250 (in power module 240) is counter-pumped by final pump sources 230. Of course, the person of ordinary skill in the art will appreciate that a wide variety of dual-stage optical fiber system architectures can be adapted for use in the present invention. Examples of dual-stage optical fiber lasers are conventional in the art, and are described, for example, in U.S. Pat. Nos. 7,817,683, 8,229,260 and 7,463,411, each of which is hereby incorporated herein by reference in its entirety.

Figure 3:
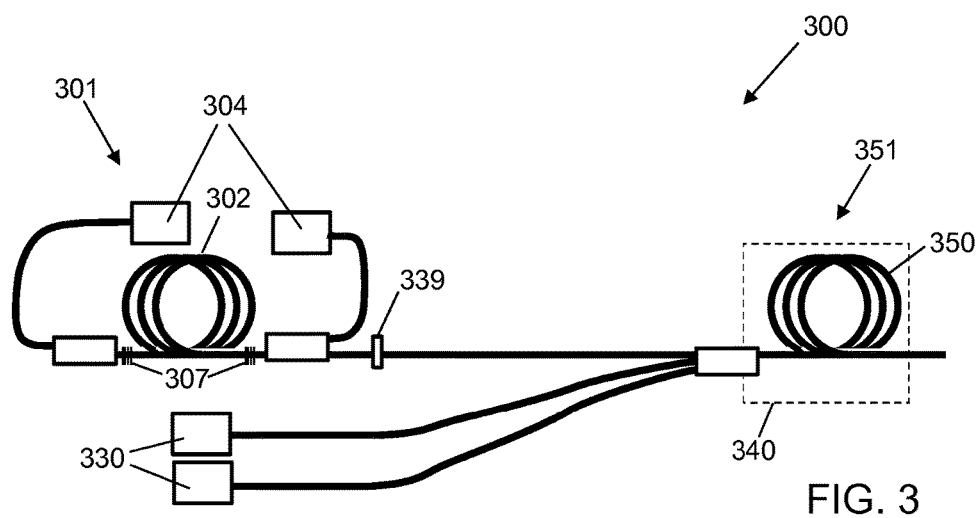
FIG. 3 is a schematic view of an optical fiber laser according to another embodiment of the invention.

Another embodiment is shown in schematic view in FIG. 3. Here, the optical fiber laser 300 is configured as a master oscillator power amplifier (i.e., a MOPA), in which the initial amplifier stage 301 is configured as a laser cavity (defined by fiber Bragg gratings 307 and first active optical fiber 302) pumped by first pump sources 304, and the final amplifier stage 351 is part of power module 340, and is configured with final active optical fiber 350 being pumped by final pump sources 330. Isolator 339 is disposed between the initial amplifier stage 301 and the final amplifier stage 351, as is conventional.

In certain embodiments, the optical fiber system includes one or more additional initial amplifier stages. In certain such embodiments, the initial amplifier stages can be, for example, configured end-to-end, such that each successive initial amplifier stage amplifies the signal from the previous initial amplifier stage. For example, in one embodiment, an optical fiber system further includes a final initial amplifier stage having an output operatively coupled to an input of the first active optical fiber of the initial amplifier stage. In one embodiment, the second initial amplifier stage comprises a second active optical fiber operatively coupled to one or more second pump sources, the second active optical fiber of the second initial amplifier stage having an output operatively coupled to an input of the first active optical fiber of the initial amplifier stage. The one or more second pump sources are configured such that they provide energy at one or more second pump wavelengths to the second active optical fiber of the second initial amplifier stage. The one or more second pump sources can be, for example, diode lasers.

Figure 4:
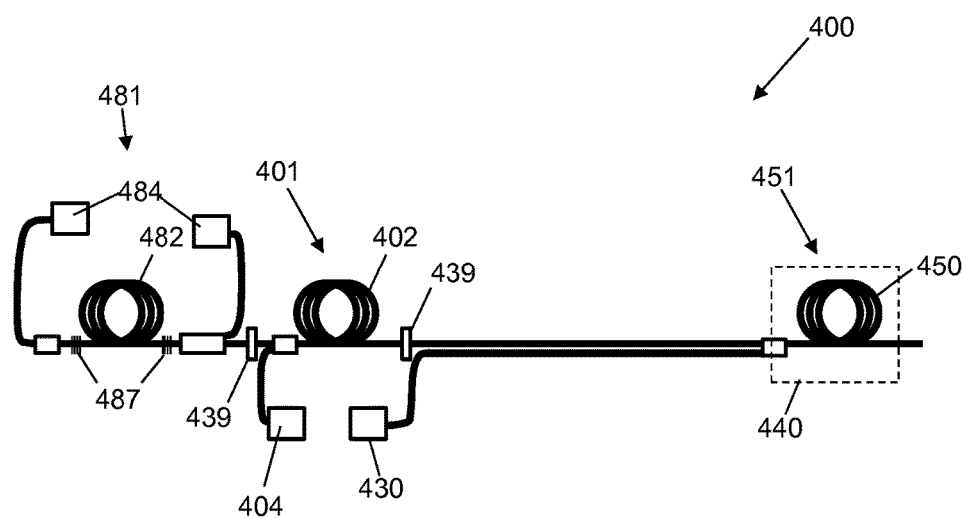
FIG. 4 is a schematic view of an optical fiber laser according to another embodiment of the invention.

Such an embodiment is shown in schematic view in FIG. 4, in which optical fiber laser 400 is configured as a MOPA, in which the second initial amplifier stage 481 is configured as a master laser, and initial amplifier stage 401 and final amplifier stage 451 are configured to amplify the power from the second initial amplifier stage 481. Thus, initial amplifier stage 401 includes a first active optical fiber 402, pumped by first pump source 404, and the final amplifier stage 451 is part of power module 440, is configured with final active optical fiber 450 being pumped by final pump source 430. Operatively coupled to an input of the first active optical fiber 402 (here, through a pump coupler and an isolator) is second initial amplifier stage 481, in this embodiment, configured as a fiber laser cavity (defined by fiber Bragg gratings 487 and second active optical fiber 482) pumped by second pump sources 484. Isolators 439 are disposed between the initial amplifier stage 401 and the final amplifier stage 451, as is conventional.

In certain embodiments, an optical fiber system as described herein includes a power module enclosure, in which the power module is disposed. In certain such embodiments, the one or more final pump optical fibers and the first signal optical fiber are provided in one or more cables or conduits extending to the power module enclosure. One embodiment of an optical fiber system as packaged is shown in schematic view in FIG. 5. Here, optical fiber laser 500 includes a power module enclosure 570, in which the final active optical fiber is enclosed, but in which no pump sources are enclosed. The power module enclosure can be made from any desirable material, for example, plastic, metal, or a combination of the two. The person of ordinary skill in the art can, based on the present disclosure, select a power module enclosure that provides a desired level of environmental protection and shielding to the power module, keeping in mind that a relatively lower level of environmental protection and shielding may be necessary as compared to an enclosure that encloses a pump source, a power supply, control electronics, or other system components.

Figure 5:
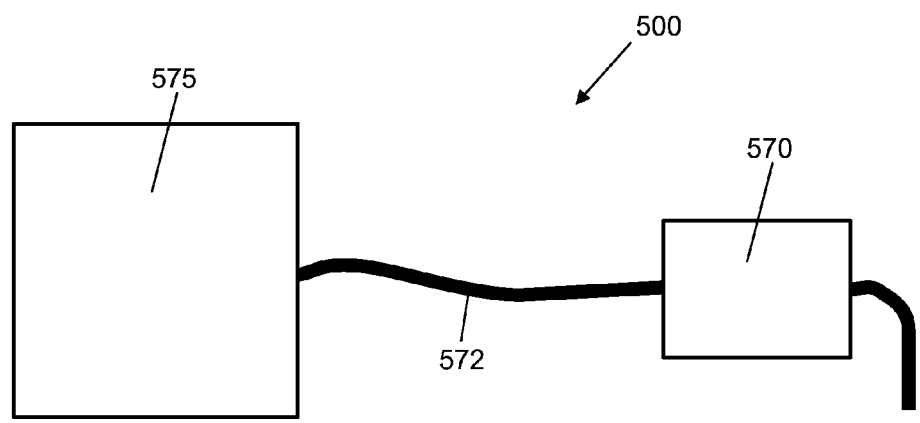
FIG. 5 is a schematic view of an optical fiber laser (i.e., as packaged) according to another embodiment of the invention.

In the embodiment shown in FIG. 5, one or more final pump optical fibers and a first signal optical fiber are provided in one or more (here, one) cables 572 extending to the power module enclosure. In the embodiment of FIG. 5, the couplings of the one or more final pump optical fibers and the signal optical fiber to the final active optical fiber are made inside the power module enclosure; in other embodiments, various of these couplings can be formed outside the power module enclosure, for example, as part of the one or more cables or enclosed by the conduit. But in certain desirable embodiments, less than 1 m, less than 50 cm, or even less than 10 cm of the final active optical fiber is disposed outside the power module enclosure.

In certain embodiments, the optical fiber system further comprises one or more additional enclosures in which system components (e.g., the initial amplifier stage(s), the one or more pump sources associated with the initial amplifier stage(s), and the one or more final pump sources) are disposed. For example, in the embodiment shown in schematic view in FIG. 5, optical fiber laser 500 also includes main system enclosure 575, in which the first active optical fiber, the one or more first pump sources, the one or more final pump sources, and various power supplies and control electronics are disposed. The first signal optical fiber and the one or more final pump optical fibers extend from the main system enclosure to the power module enclosure via cable 572.

Figure 6:
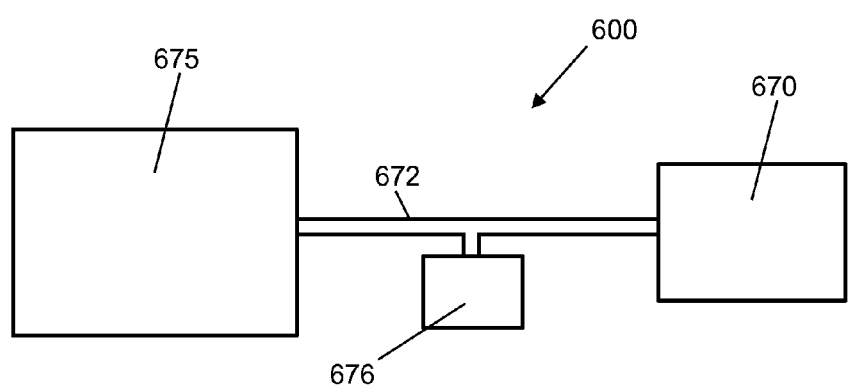
FIG. 6 is a schematic view of an optical fiber laser (i.e., as packaged) according to another embodiment of the invention.

Of course, the person of ordinary skill in the art will appreciate that other system components can be provided in other numbers and configurations of enclosures. For example, as shown in schematic view in FIG. 6, optical fiber laser 600 includes a power module enclosure 670, in which the final active optical fiber is enclosed, but in which no pump sources are enclosed; a main system enclosure 675 in which the first active optical fiber and various power supplies and control electronics are disposed; and a final pump source enclosure 676 in which the one or more final pump sources are disposed. In this embodiment, a conduit 672 extends from main system enclosure 675 to the power module enclosure 670, with a branch extending to final pump source enclosure 676. The first signal optical fiber can extend from main system enclosure 675 to the power module enclosure 670 and the one or more final pump optical fibers can extend from the final pump source enclosure 676 to the power module enclosure through conduit 672. Moreover, electrical power and/or control wiring can extend from the main system enclosure 675 to the power module enclosure through conduit 672.

The person of ordinary skill in the art will recognize that other configurations are possible and can, based on the present disclosure, select a system configuration that distributes the system components in a desired manner. For example, an embodiment in which the one or more final pump sources are provided in a separate enclosure from the main system enclosure can help increase system design flexibility, in that the loss along the one or more final pump optical fibers can be selected independently from the loss along the first signal fiber. In embodiments where multiple initial amplifier stages are used, they can be disposed together in a single enclosure, or in multiple enclosures. The person of ordinary skill in the art can, based on the present disclosure, balance these considerations with the need to spatially remove the main system components and the one or more final pump optical fibers from a site of ultimate use of the radiation generated by the system.

The other system enclosures (such as the main system enclosure and the final pump laser enclosure) can be made from any desirable materials, for example, plastic, metal, or a combination of the two. The person of ordinary skill in the art can, based on the present disclosure, select enclosures that provide a desired level of environmental protection and shielding, keeping in mind the environmental protection and shielding needs of the particular system components enclosed therein. As described above, these other system enclosures may require relatively less environmental protection or shielding than they might if they were disposed at the point of use as in conventional optical fiber laser systems.

In certain embodiments, the optical path length between the power module enclosure and the enclosure in which the first active optical fiber of the initial amplifier stage is disposed is at least about 1 m, at least about 2 m, at least about 5 m, 10 m, at least about 20 m, or even at least about 50 m; and the optical path length between the power module enclosure and each of the enclosures in which a final pump source is disposed is at least about 1 m, at least about 2 m, at least about 5 m, 10 m, at least about 20 m, or even at least about 50 m. In certain such embodiments, the optical path length between the power module enclosure and the enclosure in which the first active optical fiber of the initial amplifier stage is disposed is no more than about 50 m, no more than about 100 m, no more than about 500 m, no more than about 1000 m, or even no more than about 10000 m, and the optical path length between the power module enclosure and each of the enclosures in which a final pump source is disposed is no more than about 100 m, no more than about 500 m, no more than about 1000 m, or even no more than about 10000 m. For example, in one embodiment, the optical path length between the power module enclosure and the enclosure in which the first active optical fiber of the initial amplifier stage is disposed is in the range of about 1 m to about 100 m, and the optical path length between the power module enclosure and each of the enclosures in which a final pump source is disposed is in the range of about 1 m to about 100 m. In another embodiment, the optical path length between the power module enclosure and the enclosure in which the first active optical fiber of the initial amplifier stage is disposed is in the range of about 2 m (or about 5 m) to about 100 m, and the optical path length between the power module enclosure and each of the enclosures in which a final pump source is disposed is in the range of about 2 m (or about 5 m to about 100 m. In another embodiment, the optical path length between the power module enclosure and the enclosure in which the first active optical fiber of the initial amplifier stage is disposed is in the range of about 1 m (or about 2 m) to about 50 m, and the optical path length between the power module enclosure and each of the enclosures in which a final pump source is disposed is in the range of about 1 m (or about 2 m to about 50 m.

In certain embodiments, the spatial distance between the power module enclosure and the enclosure in which the first active optical fiber of the initial amplifier stage is disposed is at least about 1 m, at least about 2 m, at least about 5 m, 10 m, at least about 20 m, or even at least about 50 m; and the spatial distance between the power module enclosure and each of the enclosures in which a final pump source is disposed is at least about 1 m, at least about 2 m, at least about 5 m, 10 m, at least about 20 m, or even at least about 50 m. In certain such embodiments, the spatial distance between the power module enclosure and the enclosure in which the first active optical fiber is disposed is no more than about 100 m, no more than about 500 m, no more than about 1000 m, or even no more than about 10000 m, and the spatial distance between the power module enclosure and each of the enclosures in which a final pump source is disposed is no more than about 50 m, no more than about 100 m, no more than about 500 m, no more than about 1000 m, or even no more than about 10000 m. For example, in one embodiment, the spatial distance between the power module enclosure and the enclosure in which the first active optical fiber of the initial amplifier stage is disposed is in the range of about 1 m to about 100 m, and the spatial distance between the power module enclosure and each of the enclosures in which a final pump source is disposed is in the range of about 1 m to about 100 m. In another embodiment, the spatial distance between the power module enclosure and the enclosure in which the first active optical fiber of the initial amplifier stage is disposed is in the range of about 2 m (or about 5 m) to about 100 m, and the spatial distance between the power module enclosure and each of the enclosures in which a final pump source is disposed is in the range of about 2 m (or about 5 m) to about 100 m. In another embodiment, the spatial distance between the power module enclosure and the enclosure in which the first active optical fiber of the initial amplifier stage is disposed is in the range of about 1 m (or about 2 m) to about 50 m, and the spatial distance between the power module enclosure and each of the enclosures in which a final pump source is disposed is in the range of about 1 m (or about 2 m) to about 50 m.

The person of ordinary skill in the art can also, based on the present disclosure, select appropriate conduit and/or cabling materials to extend between the various system enclosures. Generally, any desirable materials may be used, such as plastic or metal. For example, a cable may take the form of a reinforced optical fiber cable as is common in the optical fiber arts. A conduit can take the form of a plastic or metal tube, for example, with a flexible "gooseneck" design. Notably, in certain embodiments, no electrical wiring extends to the power module enclosure for use in transmission of power or of electronic control signals to the power module enclosure. In certain embodiments, no electrical wiring extends to or is included in the power module enclosure. In certain embodiments, any cable or conduit that extends to the power module enclosure need not be shielded for electrical purposes (either because no wiring is included therein, or because the wiring that is included therein does not require shielding). For example, in the embodiment shown in FIG. 5, the cable 572 carries the first signal optical fiber and the one or more final pump source fibers, but because it does not bear any electrical wiring (e.g., for power supply or electronic control), it need not be shielded. The person of ordinary skill in the art can, based on the present disclosure, provide desired materials and configurations for cables and/or conduits for use in the present invention.

As the person of ordinary skill in the art will appreciate, the final active optical fiber and other optical components in the power module can generate heat in the amplification process. In certain embodiments, the person of ordinary skill in the art can select final active optical fiber and other optical components in the power module to have a desirably high efficiency, such that waste heat generated in the power module is low enough to obviate the use of active cooling, such as the use of piped cooling media or other cooling devices. Accordingly, in certain embodiments no active cooling elements (e.g., piped cooling media, electrical coolers such as thermoelectric coolers, or fans) are in substantial thermal contact with the final active optical fiber.

Figure 7:
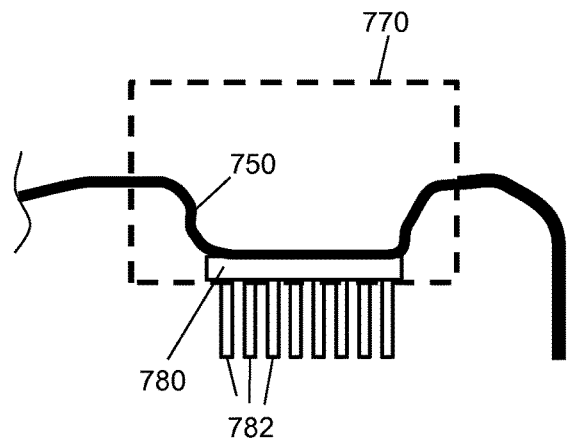
FIG. 7 is a partial schematic view of an optical fiber laser according to another embodiment of the invention.

In certain embodiments, it can be desirable to include a passive cooling element, for example, for radiative cooling, in substantial thermal contact with the final active optical fiber. The passive cooling element can, for example, take the form of one or more fins in substantial thermal contact with (e.g., extending from) a plate that is in substantial thermal contact with the final active optical fiber. The one or more fins can, for example, be disposed on the outside surface of a power module enclosure in which the final active optical fiber is disposed. The person of ordinary skill in the art can, based on the present disclosure, adapt known passive cooling devices for use with the final active optical fiber and power module disclosure as described herein. One embodiment of a device including a passive cooling element is shown in partial schematic view in FIG. 7. In the embodiment of FIG. 7, final active optical fiber 750 is disposed in power module enclosure 770, in substantial thermal contact with plate 780. Extending from plate 780 are fins 782, which are disposed outside of the power module enclosure so that they can radiate heat to the environment. As shown in the embodiment of FIG. 7, the fins can extend from the plate and pass through the wall of the power module enclosure. In other embodiments, the fins do not cross the wall of the power module enclosure, but rather are in substantial thermal contact with the wall of the power module enclosure, which in turn is in substantial thermal contact with the final active optical fiber (e.g., acting as the plate itself, or in substantial thermal contact with the plate). Use of passive cooling such as radiative cooling can advantageously decrease the size and complexity of the power module, and can be especially advantageous in devices in which no electrical or electronic devices are provided in the power module or power module enclosure.

Figure 8:
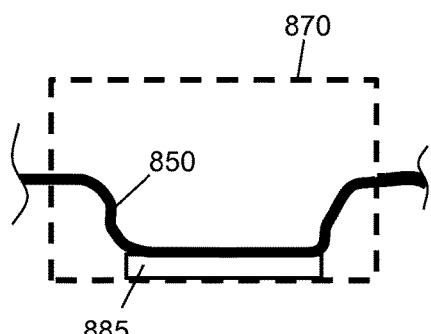
FIG. 8 is a partial schematic view of an optical fiber laser according to another embodiment of the invention.
Figure 9:
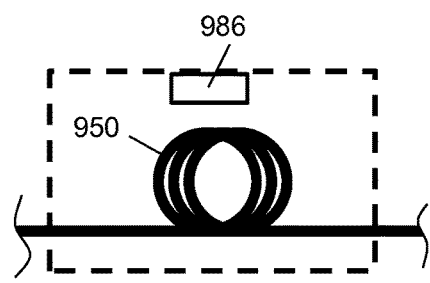
FIG. 9 is a partial schematic view of an optical fiber laser according to another embodiment of the invention.

Of course, in some embodiments, it may be acceptable to include active cooling of the final active optical fiber. For example, active cooling devices such as fans and thermoelectric coolers require relatively little in the way of space and shielding, and thus in some embodiments may not increase power module complexity and size to an unacceptable degree. Thus, in certain embodiments, the optical fiber system includes a thermoelectric cooler in substantial thermal contact with the final active optical fiber; or a fan configured to move air across the final active optical fiber. In certain embodiments, the power supply and/or control electronics for the active cooling device can be located remotely (e.g., at the distances described above with respect to the first active optical fiber), with one or more wires extending to the active cooling device to provide power and/or control. The one or more wires can extend together with a cable or conduit that provides optical fiber(s) to the power module, or can be provided separately. The person of ordinary skill in the art will, based on the present disclosure, configure such devices to provide a desired level of cooling to the final active optical fiber. FIGS. 8 and 9 are partial schematic views of embodiments including active cooling of the final active optical fiber. In the embodiment of FIG. 8, a thermoelectric cooler 885 is disposed in the power module enclosure 870; the final active optical fiber 850 is disposed such that it is in substantial thermal contact with the thermoelectric cooler 885. In the embodiment of FIG. 9, a fan 986 is configured to blow air across final active optical fiber 950.

Figure 10:
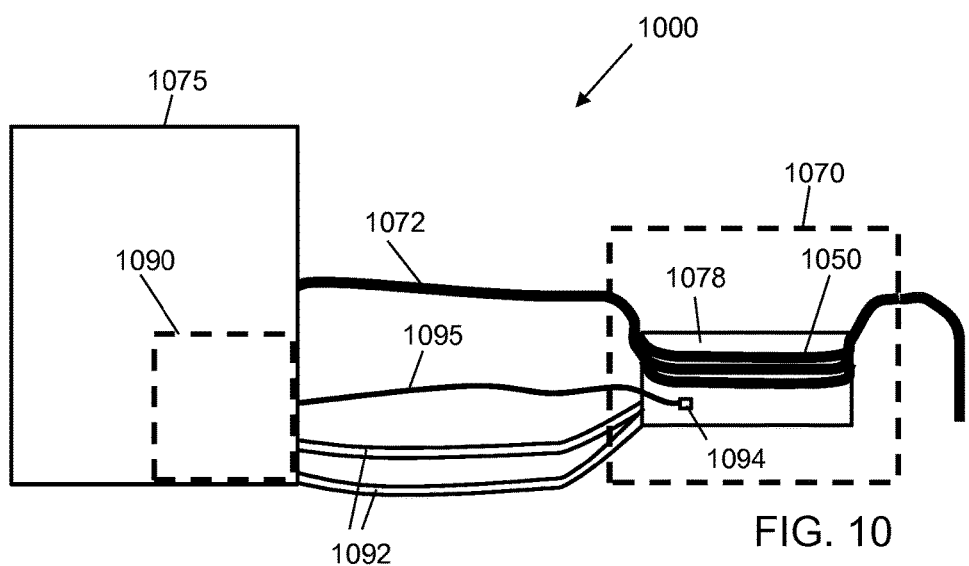
FIG. 10 is a partial schematic view of an optical fiber laser according to another embodiment of the invention.

In other embodiments, it may be desirable to cool the final active optical fiber with a fluid, as is conventional in amplifying optical fiber systems. In certain such embodiments, the temperature control and pumping apparatus can be provided remotely (e.g., at the distances described above with respect to the first active optical fiber), with one or more tubes extending to the power module to provide cool fluid to the final active optical fiber. The one or more tubes can extend together with a cable or conduit that provides optical fiber(s) to the power module, or can be provided separately. The optical fiber system can also, in some embodiments, include a temperature sensor (e.g., a thermistor, or an optically based temperature sensor such as an optical fiber bearing a Bragg grating) in substantial thermal contact with the final active optical fiber. The electronics for the temperature sensor can be provided remotely (e.g., at the distances described above with respect to the first active optical fiber, for example, together with the temperature control and pumping apparatus for the fluid) with one or more wires and/or optical fibers extending to the temperature sensor. The fluid can be, for example, water. The final active optical fiber is disposed in the power module enclosure in substantial thermal contact with the fluid, as is conventional in the art. For example, the final active optical fiber can be wrapped on a spool having passages through which the fluid is pumped. One embodiment of a device in which the final active optical fiber is fluid cooled is depicted in partial schematic view in FIG. 10. Optical fiber laser 1000 of FIG. 10 includes a fluid pump 1090 (here, disposed within main system enclosure 1075). In power module enclosure 1070, final active optical fiber 1050 is wrapped around spool 1078, so as to be in substantial thermal contact therewith. Extending from the fluid pump 1090 to the spool 1078 are tubes 1092, through which fluid can be pumped through the spool (e.g., through passages formed therein), thus transferring heat away from the final active optical fiber. In this embodiment, the tubes 1092 are shown as being spatially separated from the cable 1072; in other embodiments, the tubes can extend together with a cable or conduit connecting the main system enclosure to the power module enclosure, as described above. In the embodiment of FIG. 10, a temperature sensor 1094 is provided in substantial thermal contact with the spool, to provide for temperature feedback control of the cooling. Wire or optical fiber 1095 extends from the main system enclosure 1075 to the temperature sensor. While the embodiment of FIG. 10 includes a temperature sensor, the person of ordinary skill in the art will recognize based on the present disclosure that in other embodiments, cooling can be feedback controlled by monitoring the output of the final active optical fiber (e.g., with a fiber tap, not shown).

Figure 11:
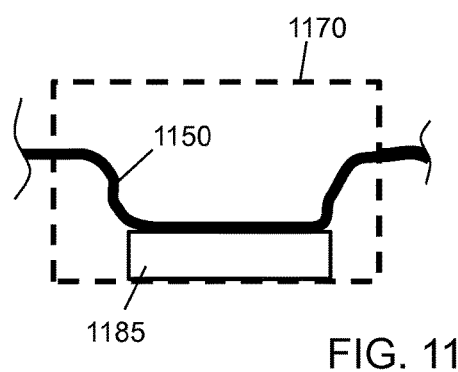
FIG. 11 is a partial schematic view of an optical fiber laser according to another embodiment of the invention.

In other embodiments, a phase change material such as a wax or a metal (e.g., in the form of an alloy) can be disposed in substantial thermal contact with the final active optical fiber to cool the final active optical fiber during use. The identity, melting temperature and amount of the wax can be selected such that as the final active optical fiber heats up, the phase change material absorbs the heat by melting. Such an embodiment is shown in partial schematic view in FIG. 11. In the embodiment of FIG. 11, a phase change material 1185 is disposed in the power module enclosure 1170; the final active optical fiber 1150 is disposed such that it is in substantial thermal contact with phase change material 1185. The person of ordinary skill in the art will understand that an optical fiber system according to this embodiment may have to operated so that power generation is stopped occasionally, to allow the phase change material to cool down and resolidify. A fan, as described above, can be used to help to cool the phase change material in some embodiments. In other embodiments, no electrical components are necessary.

In certain embodiments, because of the potentially dangerously high optical power that can be contained and provided by the optical fiber system, it can be desirable to include a failure detection system. For example, as is conventionally done in the optical fiber laser art, an optical fiber bearing high optical power (e.g., the output optical fiber, the first signal optical fiber, or both) is accompanied by a wire (e.g., in the form of one or more helically wound brass wire armor containing the optical fiber(s)). An electrical continuity device monitors the impedance of the brass wire; if the impedance of the wire increases by an amount that indicates an unacceptable rise in temperature or indicates an open circuit due to a burn, an emergency stop sequence can be initiated, or some other corrective action (e.g., reduction of pump power, diversion of system output) can be taken. Other electrical-based temperature sensing devices, e.g., thermistors, can alternatively be used in the failure detection system. In certain such embodiments, the only electrical wiring extending to the power module or the power module enclosure is the electrical wiring for the electrical-based temperature sensing device(s).

Advantageously, in certain embodiments, the optical fiber system includes no electrical or electronic components in the power module (or the power module enclosure, or associated with any output of the power module enclosure). Additionally, in certain such embodiments, the optical fiber system includes no electrical or electronic components in any connection to the power module (or the power module enclosure). In certain such embodiments, the optical fiber system includes no metallic components in any connection to the power module (or the power module enclosure). Accordingly, in certain embodiments, instead of using an electrical failure detection mechanism (e.g., as described above) an optical failure detection mechanism is used. For example, in one embodiment, an optical temperature sensor is used in measuring temperature in the power module or at the output of the fiber system; if the optical temperature sensor indicates an unacceptable rise in temperature, an emergency stop sequence can be initiated, or some other corrective action (e.g., reduction of pump power, diversion of system output) can be taken. The optical temperature sensor can be, for example, a distributed optical temperature sensor, as described in more detail below.

Accordingly, in certain embodiments, the optical fiber systems described herein further include an optical temperature sensor disposed in the power module, in the power module enclosure (e.g., in substantial thermal contact with the final active optical fiber), or at a point near the output of the system. The optical temperature sensor includes no electrical or electronic components at the point of temperature sensing. The optical temperature sensor can take the form of, for example, a Bragg grating, a Fabry-Perot cavity, or an optical interferometer. The person of ordinary skill in the art can, based on the present disclosure, select and implement an appropriate optical temperature sensor for a particular optical fiber system. The person of ordinary skill in the art can, based on the present disclosure, determine the appropriate placement(s) for optical temperature sensor(s) and safe operating temperatures at those placement(s). The optical temperature sensor is operatively coupled to an optical temperature sensor electronic device through an optical fiber. The optical temperature sensor electronic device can be, for example, configured to receive an optical signal from the optical temperature sensor and convert it to an electrical signal, for example, for further processing by the system control electronics. The optical temperature sensor electronic device can also include an optical source coupled to the optical fiber, for transmission to the optical temperature sensor as would be apparent to the person of ordinary skill in the art. The optical temperature sensor electronic device can be a separate device, or part of the control electronics of the optical fiber system, and can be disposed, for example, in a main system enclosure. The person of ordinary skill in the art can, based on the present disclosure, select and configure the optical temperature sensor electronic device to work with the particular optical temperature sensor and the system control electronics used. The optical fiber coupling the optical temperature sensor to the optical temperature sensor electronic device can extend together with a cable or conduit bearing the first signal optical fiber or the one or more final pump optical fibers.

Figure 12:
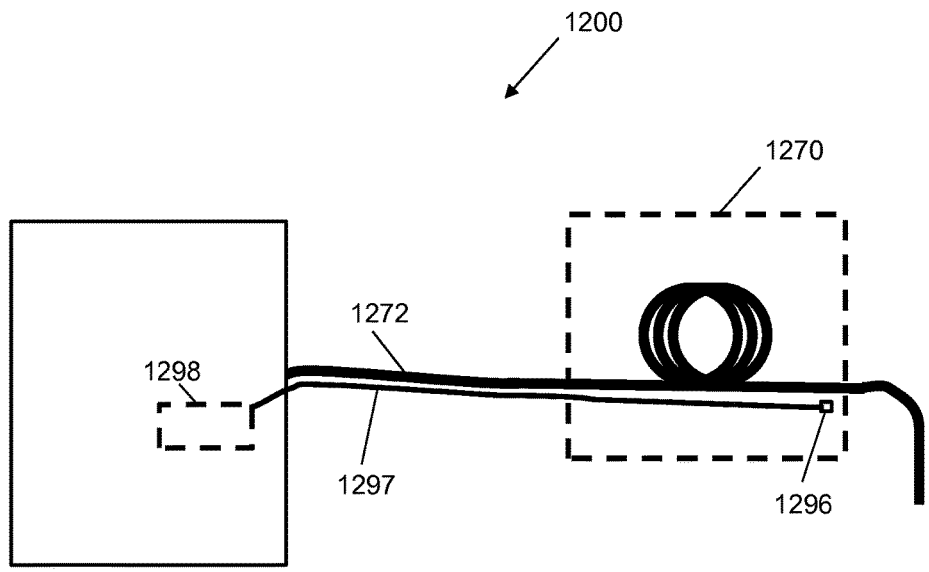
FIG. 12 is a partial schematic view of an optical fiber laser according to another embodiment of the invention.

For example, the optical fiber laser 1200 shown in partial schematic view in FIG. 12 includes an optical temperature sensor 1296 disposed in power module enclosure 1270. Thus, the optical temperature sensor can be used to monitor the temperature in the power module enclosure. The optical temperature sensor 1296 is coupled to optical temperature sensor electronics 1298 with optical fiber 1297, which extends along cable 1272 (e.g., as part of the same cable, or bundled together, or within the same conduit). In use, upon detection of an unacceptably high temperature at the optical temperature sensor, the optical temperature sensor electronics can provide information to the system control electronics, which can initiate appropriate corrective or shutdown actions.

Figure 13:
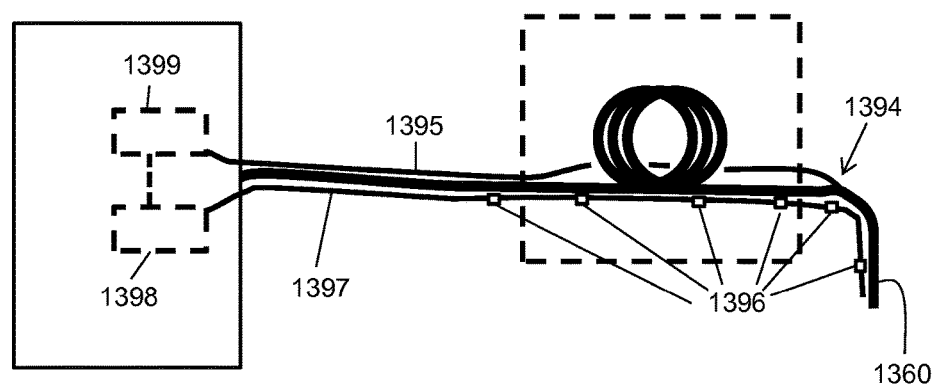
FIG. 13 is a partial schematic view of an optical fiber laser according to another embodiment of the invention.

In certain embodiments, the optical temperature sensor can be configured to provide for distributed temperature sensing. For example, in one embodiment, the optical temperature sensor can be provided as an optical fiber-based distributed optical temperature sensor, as are known in the art. For example, in one embodiment, a distributed optical temperature sensor is formed from an optical fiber having a plurality of fiber Bragg gratings formed therein. In other embodiments, other optically-based temperature sensing schemes are used, such as Raman optical time domain reflectometry or Raman optical frequency domain reflectometry, as are known in the art. Distributed sensing can, for example, be performed throughout the power module, and/or substantially all the way to the most distal point in the power delivery apparatus (e.g., the output optical fiber). Thus, performance, stability and possible failure can be monitored throughout the system. One example of such an embodiment is shown in partial schematic view in FIG. 13. In FIG. 13, optical fiber 1397 includes fiber Bragg gratings 1396, distributed throughout the power module and substantially to the end of the power delivery apparatus (here, substantially to the end of output optical fiber 1360). The optical temperature sensor electronic device 1398 can distinguish among the various fiber Bragg gratings (using, e.g., wavelength division multiplexing or time division multiplexing, as is common in the art), and therefore provide information as to the temperatures at different points in the power module. In use, upon detection of an unacceptably high temperature at any of the fiber Bragg gratings, the optical temperature sensor electronics can provide information to the system control electronics, which can initiate appropriate corrective or shutdown actions.

As described above, in certain advantageous embodiments, the optical fiber systems described herein include no electrical or electronic components in the power module (or the power module enclosure, or associated with any output of the power module enclosure). Thus, in certain embodiments, the device is configured such that optical feedback from the power module, but no electrical or electronic feedback from the power module, is used in feedback control of the optical fiber system. For example, in the embodiment of FIG. 13, a tap coupler 1394 is configured to sample a small fraction of the amplified optical radiation (here, from output optical fiber 1360). The sampled radiation is transmitted by optical fiber 1395 back to the control electronics 1399, which can use the information to perform feedback control of the system. Moreover, the temperature information from the optical temperature sensor (e.g., from the fiber Bragg gratings 1396 of FIG. 13) can be similarly used in feedback control. Accordingly, when only optical feedback is used to monitor optical performance in the power module, the need for the module size and shielding associated with electronic or electrical components in the power module is obviated.

In certain embodiments, the optical fiber systems described herein are configured to provide high optical power at the output of the final active optical fiber, for example, at least about 5 W, at least about 10 W, or even at least about 20 W of optical power.

Another aspect of the invention is a method for generating high power radiation. The method includes pumping a first active optical fiber with one or more first pump sources, thereby providing a first optical signal at an output of the first active optical fiber; transmitting the first optical signal from the output of the first active optical fiber to an input of a final active optical fiber using a first signal optical fiber; and pumping the final active optical fiber with one or more final pump sources to provide the high power radiation at an output of the final active optical fiber. Notably, the final active optical fiber is provided in a power module separated from the one or more final pump sources and the first active optical fiber, for example, as described above with respect to the optical fiber systems described herein. In certain embodiments, the method further includes transmitting the high power radiation from output of the final active optical fiber with an output optical fiber. Various components, devices and systems as described above with respect to optical fiber systems can be used in the methods of the invention. Moreover, the method may include additional method steps and components as described above with respect to optical fiber systems described herein.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 8th Edition, 8th Revision.

It is understood that the use of the term "a", "an" or "one" herein, including in the appended claims, is open ended and means "at least one" or "one or more", unless expressly defined otherwise. The occasional use of the terms herein "at least one" or "one or more" to improve clarity and to remind of the open nature of "one" or similar terms shall not be taken to imply that the use of the terms "a", "an" or "one" alone in other instances herein is closed and hence limited to the singular. Similarly, the use of "a part of", "at least a part of" or similar phrases (e.g., "at least a portion of") shall not be taken to mean that the absence of such a phrase elsewhere is somehow limiting.

Subsequent reference to the phrase "at least one", such as in the phrase "said at least one", to specify, for example, an attribute of the limitation to which "at least one" initially referred is not to be interpreted as requiring that the specification must apply to each and every instance of the limitation, should more than one be under consideration in determining whether the claim reads on an article, composition, machine or process, unless it is specifically recited in the claim that the further specification so applies.

The use of "or", as in "A or B", shall not be read as an "exclusive or" logic relationship that excludes from its purview the combination of A and B. Rather, "or" is intended to be open, and include all permutations, including, for example A without B; B without A; and A and B together, and as any other open recitation, does not exclude other features in addition to A and B.

Any of the features described above in conjunction with any one aspect described above can be combined with a practice of the invention according to any other of the aspects described above, as is evident to one of ordinary skill who studies the disclosure herein.

Those of ordinary skill in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not expressly taught as mutually inconsistent, is included within the scope of the present invention.

What is claimed is:

1. A high power optical fiber system comprising
   an initial amplifier stage comprising a first active optical fiber operatively coupled to one or more first pump sources, the first active optical fiber having an output of amplified radiation, the initial amplifier stage being configured in a first enclosure;
   a first signal optical fiber having an input operatively coupled to the output of amplified radiation having a wavelength of the first active optical fiber of the initial amplifier stage and an output;
   one or more final pump sources;
   one or more final pump optical fibers, each having an input coupled to one or more of the final pump sources and an output; and
   a power module comprising a final amplifier stage, the final amplifier stage comprising a final active optical fiber having an input operatively coupled to the output of the first signal optical fiber and an output of amplified radiation having the wavelength, the final active optical fiber being operatively coupled to the outputs of the one or more final pump optical fibers, the power module being disposed in a power module enclosure separated from the first enclosure by an optical path length in the range of about 1 m to about 100 m and by a spatial distance in the range of about 1 m to about 100 m,
   wherein
      the first single optical fiber extends from the initial amplifier stage to the power module,
      the optical path length between the first active optical fiber and the final active optical fiber is no more than about 100 m,
      the optical path length between each of the one or more final pump sources and the final active optical fiber is no more than about 100 m,
      the power module enclosure has no pump sources disposed therein, and
      the high power optical fiber laser system is configured to output at least 20 W of optical power at the output of the final active optical fiber.

2. The optical fiber system according to claim 1, wherein each of the one or more final pump optical fibers has a length of at least about 10 m.

3. The optical fiber system according to claim 1, wherein the one or more final pump optical fibers have a length in the range of about 1 m to about 100 m.

4. The optical fiber system according to claim 1, wherein the first signal optical fiber has a length of at least about 10 m.

5. The optical fiber system according to claim 1, wherein the first signal optical fiber has a length in the range of about 1 m to about 100 m.

6. The optical fiber system according to claim 1, wherein the optical path length between the first active optical fiber and the final active optical fiber is at least about 2 m.

7. The optical fiber system according to claim 6, wherein the optical path length between each of the one or more final pump sources and the final active optical fiber is at least about 2 m.

8. The optical fiber system according to claim 1, wherein the spatial distance between the initial amplifier stage and the final active optical fiber is at least about 2 m.

9. The optical fiber system according to claim 8, wherein the spatial distance between each of the one or more final pump sources and the final active optical fiber is at least about 2 m.

10. The optical fiber system according to claim 8, wherein the spatial distance between the initial amplifier stage and the final active optical fiber is no more than about 100 m, and the spatial distance between each of the one or more final pump sources and the final active optical fiber is no more than about 100 m.

11. The optical fiber system according to claim 1, wherein the power module does not include any electrical or electronic devices.

12. The optical fiber system according to claim 1, wherein the one or more final pump optical fibers and the first signal optical fiber are provided in one or more cables or conduits extending to the power module enclosure.

13. The optical fiber system according to claim 1, wherein the optical path distance between the power module enclosure and any enclosures in which a final pump source is disposed is in the range of about 1 m to about 100 m, and the spatial distance between the power module enclosure and any enclosures in which a final pump source is disposed is in the range of about 1 m to about 100 m.

14. The optical fiber system according to claim 1, wherein the power module enclosure does not enclose any electrical or electronic devices.

15. The optical fiber system according to claim 14, wherein the optical fiber system includes no electrical or electronic components in any connection to the power module enclosure.

16. The optical fiber system according to claim 15, wherein optical fiber system includes no metallic components in any connection to the power module enclosure.

17. The optical fiber system according to claim 1, further comprising an optical temperature sensor, and an optical temperature sensor electronic device coupled to the optical temperature sensor through an optical fiber.

18. The optical fiber system according to claim 1, configured such that optical feedback from the power module, but no electrical or electronic feedback from the power module, is used in feedback control of the optical fiber system.

19. The optical fiber system according to any claim 1, further comprising a second initial amplifier stage having an output operatively coupled to an input of the first active optical fiber of the initial amplifier stage.

20. A method for generating high power radiation comprising
providing an optical fiber system according to claim 1,
pumping the first active optical fiber with one or more first pump sources, thereby providing a first optical signal having the wavelength at an output of the first active optical fiber;
transmitting the first optical signal from the output of the first active optical fiber to the input of the final active optical fiber using the first signal optical fiber;
pumping the final active optical fiber with the one or more final pump sources to provide the high power radiation having the wavlength at an output of the final active optical fiber, the high power radiation having a power of at least 20 W.

21. The optical fiber system according to claim 1, wherein the optical path length between the first active optical fiber and the final active optical fiber is at least about 10 m, and the optical path length between each of the one or more final pump sources and the final active optical fiber is at least about 10 m.

22. The optical fiber system according to claim 1, wherein the spatial distance between the initial amplifier stage and the final active optical fiber is at least about 10 m, and the spatial distance between each of the one or more final pump sources and the final active optical fiber is at least about 10 m.

23. The optical fiber system according to claim 1, wherein the optical path distance between the power module enclosure and the first enclosure is in the range of about 1 m to about 50 m, and the optical path distance between the power module enclosure and any enclosures in which a final pump source is disposed is in the range of about 1 m to about 50 m.

24. The optical fiber system according to claim 1, wherein the power module enclosure is separated from the first enclosure by a spatial distance in the range of about 2 m to about 50 m and by an optical path length in the range of about 2 m to about 50 m.

25. The optical fiber system according to claim 1, wherein the final active optical fiber has at its active species ytterbium, thulium or neodymium.

26. The optical fiber system according to claim 1, wherein the first active optical fiber is configured in a laser cavity.

27. The optical fiber system according to claim 1, wherein the total length of optical fiber operatively coupled to the output of the final active optical fiber is less than about 10m.

* * * * *